Aug. 14, 1956  G. E. CROSBY ET AL  2,758,941
LUMINESCENT MATERIALS AND APPLICATIONS THEREOF
Filed Nov. 18, 1954
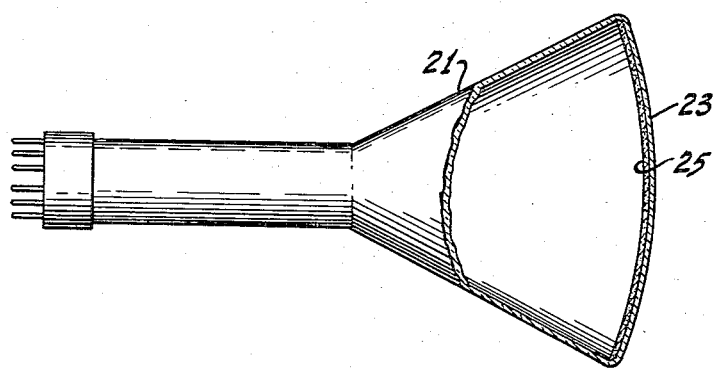
INVENTORS
GILMORE E. CROSBY AND
THOMAS W. EDWARDS
BY
ATTORNEY

United States Patent Office 2,758,941
Patented Aug. 14, 1956

2,758,941
LUMINESCENT MATERIALS AND APPLICATIONS THEREOF

Gilmore E. Crosby, Millersville, and Thomas W. Edwards, Lancaster, Pa., assignors to Radio Corporation of America, a corporation of Delaware Application November 18, 1954, Serial No. 469,674

14 Claims. (Cl. 117—33.5)

This invention relates to improvements in methods of treating phosphor particles, which particles may be used for making viewing screens for cathode ray tubes, luminescent lamps, kinescopes for television and the like. The invention relates also to improved luminescent materials, luminescent screens comprising said improved luminescent materials of the invention and methods for preparing said screens.

Luminescent screens may be produced by, first preparing a suspension of phosphor particles in a liquid and then settling the phosphor particles through the liquid onto a support for said screen. Subsequently, the supernatant liquid is decanted or siphoned off leaving a layer of phosphor material on said support. The zinc sulphide and zinc cadmium sulphide phosphors have long been used in this type of process for making luminescent viewing screens for cathode ray tubes. A mixture of two different phosphors may be used to produce white-emitting viewing screens for television kinescopes, for example a blue-emitting zinc sulphide with silver activator and a yellow-emitting zinc cadmium sulphide with silver activator mixed in the proper proportions will produce a white-emitting material.

When forming luminescent screens by settling such phosphors from an aqueous suspension, certain difficulties are encountered. For example, there is a tendency for the layer of the settled material to be disturbed during the removal of the supernatant liquid. Also there is relatively poor adherence to the support while the material is wet, so that the material tends to avalanche if the support is not horizontal or has areas which are inclined to the horizontal, such as the curved edges of the face of a cathode ray tube. The ability of the phosphor particles to remain in place after they are settled will be referred to as the "wet adherence" of the phosphor.

It is known that the wet adherence of a phosphor may be improved by coating the individual particles thereof with a calcium phosphate material. This coating may be produced by suspending the phosphor particles in an aqueous medium containing a soluble phosphate and a soluble calcium salt, and then washing and drying the phosphor particles. Subsequently, the coated phosphor particles are again suspended in an aqueous medium and settled upon the face of a cathode ray tube or other support as described above. While such coatings have been somewhat successful, nevertheless, a considerable improvement in the wet adherence of the phosphor is desirable.

An object of the invention is to provide improved methods for treating phosphor particles to improve their wet adherence properties.

A further object is to provide improved methods for treating particles of zinc sulphide and zinc-cadmium sulphide phosphors to improve their wet adherence properties.

Another object is to provide improved luminescent materials and luminescent screens comprising the improved luminescent materials of the invention.

Another object is to provide improved methods for treating sulphide phosphors to be used in making luminescent viewing screens for cathode ray tubes.

A further object is to provide improved methods for preparing white-emitting luminescent viewing screens for cathode ray tubes.

In general, one feature of the invention comprises coating phosphor particles while suspended in an aqueous solution having a pH between about 10.5 and 11.0 with a thin layer of calcium hydroxyphosphate, in a manner not hitherto practiced in order to improve the wet adherence and uniformity of the product. Phosphor particles, for example silver-activated zinc sulphide or silver-activated zinc-cadmium sulphide may be suspended in a solution containing a soluble phosphate, such as trisodium phosphate, and a soluble calcium salt, such as calcium chloride, said solution having a pH between about 10.5 and 11.0. The calcium salt may be introduced as a flux material during the synthesis of the phosphor particles or may be dissolved separately in the coating solution.

The solution is adjusted to a pH between about 10.5 and 11.0 by the addition of an alkaline reagent, for example, of aqueous sodium hydroxide. The phosphor particles are then washed and dried. The dry powder may be stored for indefinite periods and later suspended in an aqueous medium for settling upon the inner surface of the viewing face plate of a cathode ray tube according to another feature of the invention.

Adjusting the suspension of phosphor particles in a solution containing a soluble phosphate and a soluble calcium salt to a pH between about 10.5 and 11.0, imparts to the phosphor free-flowing characteristics when it is a dry powder, good wet adherence properties during the step of settling a phosphor screen and relatively uniform properties from batch to batch. The invention includes the coated phosphor particles and luminescent screens comprising said particles.

The invention will be more fully described in the following detailed description when read in conjunction with the drawing in which the sole figure is a sectional view of a cathode ray tube having a luminescent viewing screen prepared in accordance with the invention.

A specific example illustrating the improved method of the invention will now be given.

First, silver-activated zinc sulphide is prepared with calcium chloride and sodium chloride fluxes.

One method for preparing the fluxed phosphor is to fire an intimate mixture of 100 parts by weight of zinc sulphide, .01 part by weight of silver as silver sulphide, 1.0 part by weight of calcium chloride and 10.0 parts by weight of sodium chloride to about 1000° C. for about 2 hours. Then, about 8 pounds (3.63 kilograms) of the unwashed silver-activated zinc sulphide phosphor fluxed with calcium chloride and sodium chloride is slurried in about three times its weight of water. The pH of this solution is about 7.0.

The phosphor slurry is then adjusted to a pH of about 10.5 to 11.0. This may be accomplished by adding an aqueous solution containing 0.1 gram of sodium hydroxide per cc. of water until the pH of the phosphor slurry reaches the desired value.

About 8.9 grams of $Na_3PO_4 \cdot 12H_2O$ are dissolved in a suitable amount of water and the solution stirred into the phosphor slurry. This amount of sodium phosphate will yield about 0.1% by weight of $Ca_3(PO_4)_2$ with respect to the weight of phosphor. The pH of the resulting solution is about 10.9.

The phosphor slurry is agitated for a short period of time, sufficient for the reagents to interact. The excess liquid is removed, the phosphor is washed, dried and then passed through a 250 mesh screen. An X-ray analysis indicates that the final phosphor particles have a coating of a complex calcium hydroxy phosphate. The composition of the coating appears to be $Ca_{10}(OH)_2(PO_4)_6$. The dry product is a free-flowing powder which shows a marked improvement in wet adherence when subsequently suspended in an aqueous medium and settled upon a substrate.

The reasons for the unexpected and improved results are not clearly understood. Upon the adjustment of the pH between about 10.5 and 11.0, it is believed that an outer coating of a complex hydroxy phosphate forms over the phosphor particles. When this coating is formed within the pH range between 10.5 and 11.0, the wet adherence of the particles is at least 300% greater than when the coating is formed outside this range. The adjustment of the solution to a pH between 10.5 and 11.0 produces a consistently uniform product which has good wet adherence properties. If the phosphor is adjusted to a pH above 11.0 or below 10.5, the resulting product has poor wet adherence properties.

The calcium salt may be introduced as a fluxing material, if it has fluxing properties, during the step of synthesizing the phosphor particles. In this way, several steps of washing out the flux are saved. However, the calcium salt may be introduced into the phosphor slurry before or after the phosphor is suspended as an aqueous solution of a calcium salt.

The pH may be adjusted before or after the soluble phosphate salt is added to the phosphor slurry. It is preferred to adjust the pH before the phosphate solution is added. The addition of calcium salt, phosphate salt and the adjustment of the pH may be carried out in any desired order provided calcium and phosphate salts are present and the pH of the solution is in the range between 10.5 and 11.0.

It is preferred to control the proportion of phosphate, calcium and phosphor such that the slurry contains between about 0.006 and 0.6% by weight of phosphate with respect to the weight of phosphor and between about .004 and 0.4% by weight of calcium as a soluble salt with respect to the weight of the phosphor.

In all of the process steps, materials of the highest purity are used. Calomel and glass electrodes are immersed in the reaction mixture throughout the entire process which permits continuous pH readings to be made. The water used should be de-mineralized or distilled.

Other substances may be used in place of trisodium phosphate, for example any of the sodium phosphates, potassium phosphates, organic phosphates or other soluble phosphates. Similarly, any soluble calcium salt such as calcium sulphate, calcium nitrate, calcium bromide or calcium acetate may be used in place of calcium chloride. Other alkalies, such as potassium hydroxide, may be used in place of sodium hydroxide. Any pH in the range of about 10.5 to 11.0 may be used.

The process is equally effective for coating other phosphors. For example, steps identical to the steps of the example may be carried out on silver-activated zinc-cadmium sulphide and manganese-activated zinc silicate phosphors to obtain equally good results.

The product, made as described above may be used to prepare a luminescent viewing screen on the inner surface of a cathode ray tube. The phosphors may be used alone, or in combination with one another to produce a white-emitting screen, or in combination with phosphors of other types.

The screen may be prepared by any well-known process. For example, the tube envelope may be placed neck upward and a quantity of distilled water poured into the open end to serve as a cushioning medium. The dried and coated phosphor particles, prepared as above described, are suspended in distilled water and the suspension poured into the cushioning medium. A small quantity of sodium or potassium silicate may be incorporated in the cushioning medium or in the phosphor suspension to serve as a binder for the screen particles. The phosphor particles are permitted to settle upon the inner face of the tube envelope to form a layer of luminescent material. The supernatant liquid is then slowly decanted, the phosphor screen dried and then baked to drive off all of the volatile materials.

Referring to the sole figure, a cathode ray tube 21 has a face plate 23 and a phosphor screen 25 deposited on the inner surface of the face plate 23 according to the above described process.

There have been described an improved process for treating phosphors which process produces a product that has good wet adherence properties and which is uniform from batch to batch. There have further been described improved luminescent screens prepared by the improved methods of the invention.

What is claimed is:

1. In a method for preparing luminescent materials, the step comprising coating the individual finely-divided phosphor particles while suspended in an aqueous medium having a pH between about 10.5 and 11.0 with a thin layer of a calcium hydroxy phosphate.

2. A method of coating phosphor particles comprising suspending said phosphor particles in an aqueous solution containing a soluble phosphate and a soluble calcium salt, said solution having a pH between about 10.5 and 11.0.

3. A method of coating phosphor particles comprising suspending said phosphor particles in an aqueous solution containing a soluble phosphate and a soluble calcium salt said solution having a pH between 10.5 and 11.0 and then drying said particles.

4. A method of coating phosphor particles selected from the class consisting of zinc sulphide and zinc-cadmium sulphide comprising suspending said phosphor particles in an aqueous solution containing a soluble phosphate and a soluble calcium salt, adjusting said solution to a pH between 10.5 and 11.0 and then drying said particles.

5. A method of coating phosphor particles comprising slurrying silver-activated zinc sulphide phosphor particles with water, stirring into said slurry a first aqueous solution containing a soluble phosphate, stirring into said slurry a second aqueous solution containing calcium, as a soluble salt, adjusting the resulting solution to a pH between about 10.5 and 11.0 and then drying said particles.

6. A method of coating phosphor particles comprising slurrying silver-activated zinc-cadmium sulphide phosphor particles with water, stirring into said slurry a first aqueous solution containing a soluble phosphate, stirring into said slurry a second aqueous solution containing calcium, as a soluble salt, adjusting the resulting solution to a pH between about 10.5 and 11.0 and then drying said phosphor particles.

7. A luminescent material comprising finely-divided phosphor particles, each particle having a thin coating of a calcium hydroxy phosphate.

8. In a method of treating a powdered phosphor to be used in making luminescent screens, the step comprising suspending said phosphor in a dilute solution of a soluble phosphate and a soluble calcium salt, wherein phosphate is present in an amount of about 0.006 to about 0.6% by weight with respect to the weight of said phosphor and calcium is present in an amount of about 0.004 to 0.4% by weight with respect to the weight of said phosphor and wherein said solution has a pH between 10.5 and 11.0.

9. In a method of producing a luminescent viewing screen, the steps of suspending phosphor particles in a solution containing a soluble phosphate and a soluble calcium salt and having a pH between about 10.5 and 11.0, drying said phosphor particles and subsequently settling said phosphor particles on a support from a liquid medium.

10. A method of making a luminescent viewing screen comprising coating the individual particles of a phosphor with a thin coating of a calcium hydroxy phosphate while said coated particles are suspended in an aqueous medium having a pH between 10.5 and 11.0, drying said phosphor particles and subsequently settling said coated phosphor on a base from an aqueous suspension of said phosphor.

11. A method of making a luminescent viewing screen comprising suspending a phosphor in finely-divided form in an aqueous solution containing a soluble phosphate and a soluble calcium salt, wherein phosphate is present in an amount between about 0.006 and about 0.6% by weight with respect to the weight of said phosphor, and calcium is present in an amount between about 0.004 and 0.4% by weight with respect to the weight of said phosphor, said solution having a pH between 10.5 and 11.0, drying said phosphor, and subsequently settling said treated phosphor particles on a substrate from a suspension of said treated phosphor.

12. A method of making a luminescent viewing screen comprising a phosphor from the class consisting of zinc sulphide and zinc-cadmium sulphide on a glass base which comprises suspending said phosphor, in a finely-divided form in a dilute solution containing a soluble phosphate and a soluble calcium salt, said phosphate being present in an amount of about 0.006 and 0.6% by weight with respect to the weight of said phosphor and calcium is present in an amount between 0.004 and 0.4% by weight, with respect to the weight of said phosphor, said solution having a pH between 10.5 and 11.0, drying said phosphor and subsequently settling a layer of said phosphor on said glass base from an aqueous suspension of said particles.

13. In a method of making a luminescent viewing screen comprising a phosphor from the class consisting of zinc sulphide and zinc-cadmium sulphide on a glass base by settling said phosphor on said base from an aqueous suspension of finely-divided phosphor particles, the steps preceding said settling operation, of coating said particles with a thin outer layer of calcium hydroxy phosphate while suspended in an aqueous medium having a pH between 10.5 and 11.0 and then drying said phosphor particles.

14. A luminescent screen comprising a glass base having on a surface thereof a layer of phosphor particles, each particle having a thin coating of calcium hydroxy phosphate.

References Cited in the file of this patent

UNITED STATES PATENTS

| | | |
|---|---|---|
| 2,435,436 | Fonda | Feb. 3, 1948 |
| 2,697,668 | Crosby | Dec. 21, 1954 |

FOREIGN PATENTS

| | | |
|---|---|---|
| 449,392 | Great Britain | June 19, 1936 |